United States Patent [19]

Kitano et al.

[11] Patent Number: 5,654,852
[45] Date of Patent: Aug. 5, 1997

[54] STOPPER MECHANISM IN A FLOPPY DISC APPARATUS

[75] Inventors: Takamasa Kitano; Jiro Nagaoka, both of Tokyo, Japan

[73] Assignee: NEC Corporation, Tokyo, Japan

[21] Appl. No.: 404,261

[22] Filed: Mar. 13, 1995

[30] Foreign Application Priority Data

May 31, 1994 [JP] Japan ................. 6-118073

[51] Int. Cl.⁶ .............. G11B 5/54; G11B 5/55; G11B 21/08; G11B 23/08
[52] U.S. Cl. .............. 360/106; 360/105; 360/247
[58] Field of Search .............. 360/106, 105, 360/247, 284

[56] References Cited

U.S. PATENT DOCUMENTS

| | | | |
|---|---|---|---|
| 4,139,877 | 2/1979 | Townsend | 360/106 |
| 4,237,504 | 12/1980 | Ho et al. | 360/106 |
| 4,870,429 | 9/1989 | Fujita et al. | 369/284 |
| 4,922,478 | 5/1990 | Verhagen | 369/247 |
| 5,379,990 | 1/1995 | Ando et al. | 369/247 |

FOREIGN PATENT DOCUMENTS 62-146478  6/1987  Japan .

*Primary Examiner*—Robert S. Tupper
*Assistant Examiner*—Adriana Giordana
*Attorney, Agent, or Firm*—Laff, Whitesel, Conte & Saret, Ltd.

[57] ABSTRACT

In a transportation or in an accident, the carriage of a floppy disc apparatus has a chance to collide with the stopper mechanism of the apparatus. A shock absorbing mechanism is provided in the stopper mechanism to avoid damage from the shock.

5 Claims, 2 Drawing Sheets

STOPPER MECHANISM IN A FLOPPY DISC APPARATUS

BACKGROUND OF THE INVENTION

This invention relates to a floppy disc apparatus, and more particularly to a stopper mechanism in a floppy disc apparatus.

In a floppy disc apparatus, a magnetic head is fixed on a carriage which is radially displaced on a floppy disc. In order to limit range of excursion of the carriage, a stopper mechanism is provided on a motor for driving the carriage or on a frame of the apparatus.

A heretofore known stopper mechanism is described in connection with FIG. 3. A carriage 1 is radially displaced as shown by a both-side-pointed arrow in the drawing. The driving mechanism is not shown in the drawing. Movement of the carriage 1 to the right (on the drawing) is stopped when a right-hand surface of the carriage 1 comes in contact with a left-hand surface of a stopper mechanism 52.

In an example shown by FIG. 3, the stopper mechanism comprises a screw which is engaged to a side wall of a frame 3 of the floppy disk apparatus.

Sometimes, the position of the carriage 1 where the carriage is stopped by the stopper mechanism 52 is used as a reference position of the carriage displacement. The reference position is precisely aligned by the screw, and after the alignment, the screw is fixed by adhesive as shown in the drawing.

In an ordinary operation of a floppy disc apparatus, the movement of the carriage becomes slow when it comes near in contact with the stopper mechanism 52, and the driving of the carriage 1 is terminated as soon as the carriage 1 is in contact with the stopper mechanism 52. Therefore, no consideration on shock absorber is necessary for operation of the apparatus. Thus, in an example of a heretofore known stopper mechanism 52 shown in FIG. 3, no shock absorbing mechanism is provided.

But, during transportation of the apparatus or by an accident, the carriage 1 can collide with the stopper mechanism 52. Since both the carriage 1 and the stopper mechanism 52 are rigid, collision between the two members may cause damage on either one of the members or on both members. Even with a slightest damage, the reference position may become unreliable.

SUMMARY OF THE INVENTION

Therefore, an object of the present invention is to provide a shock absorbing member of a stopper mechanism. In an embodiment of the present invention, the shock absorbing member comprises a coiled spring.

Another object of this invention is to provide a damper member for damping oscillation caused by collision between the carriage and the stopper mechanism. For a preferred embodiment, the damper member is made of silicon rubber.

BRIEF DESCRIPTION OF THE DRAWINGS

Further objects, features, and advantages of this invention will become apparent from a consideration of the following description, the appended claims, and the accompanying drawings in which the same numerals indicate the same or the corresponding parts.

DETAILED DESCRIPTION OF THE PREFERRED EMBODIMENTS

Figure 1:
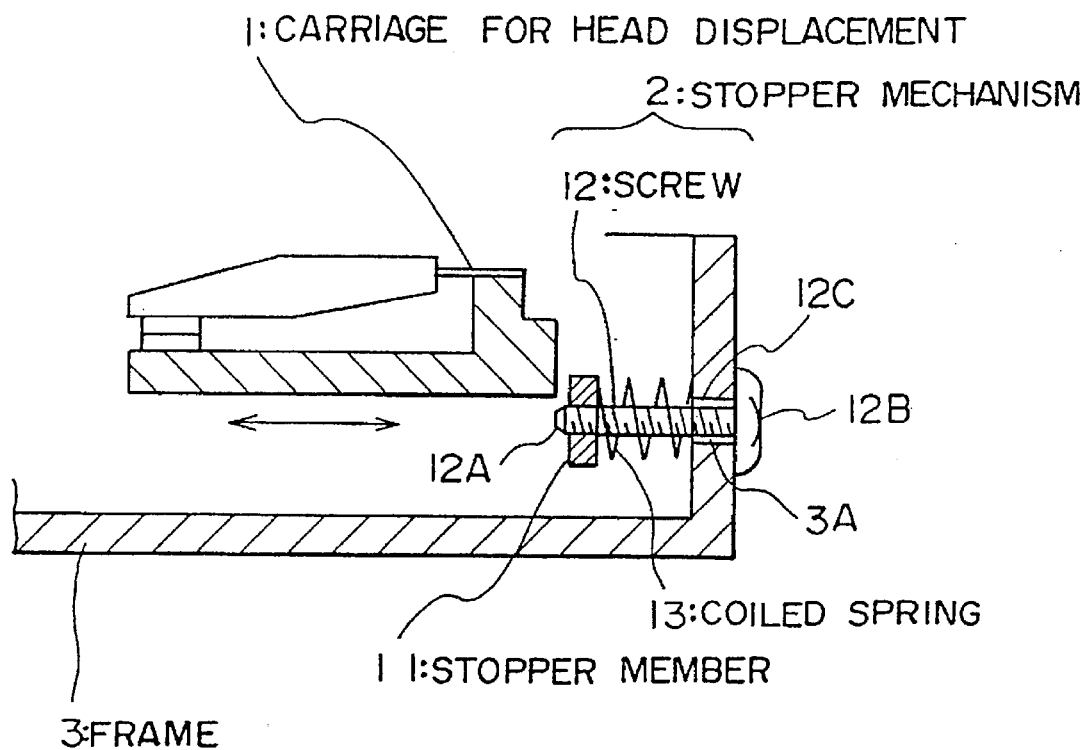
FIG. 1 shows a crosssectional view of an embodiment of this invention.

Now referring to FIG. 1, a stopper mechanism 2 of this invention comprises a stopper member 11, a screw 12 and a coiled spring 13. The body 12C of the screw 12 is loosely fit in a hole 3A provided on a side wall of the frame 3 of the apparatus. Head 12B of the screw 12 limits inward movement of the screw 12. The stopper member 11 is a nut engaged with a threaded end 12A of the body 12C. The outer surface (left-hand surface on the drawing) forms a surface for contacting with a surface of the carriage 1. The position of the outer surface of the stopper member 11 is finely adjustable by turning the screw 12 with which the stopper member 11 is engaged. The coiled spring 13 is held around the body 12C and between an inner surface of the stopper member 11 and an inner surface of the frame 3. The coiled spring 13 is compressed in an initial condition. Hence, the stopper member 11 and the screw 12 engaged with the stopper member 11 receive an elastic force from the coiled spring 13. This elastic force presses the head 12B to the wall of the frame 3.

When the carriage 1 collides with the stopper member 11, the coiled spring 13 is further compressed and the body 12C moves to the right in the hole 3A, detaching the head 12B from the wall of the frame 3.

When the colliding force disappears, the coiled spring 13 begins to expand by an elastic force. The stopper member 11 and the screw 12 engaged with the stopper member 11 moves to the left. An overshoot is prevented because the head 12B is stopped by the outer surface of the wall of the frame 3. The kinetic energy of the stopper mechanism 2 is fairly well attenuated when the head 12B comes again in contact with the frame 3. Thus, the shock caused by collision between the carriage 1 and the stopper member 11 is absorbed, and damage of the carriage 1 or of the stopper mechanism 2 can be avoided.

After a colliding force disappears, the position of the stopper member 11 is returned to its initial position, and this position can be used as a reference position of the carriage displacement. In a normal operation, a limit switch and an associated mechanism (not shown in the drawing) disables the driving mechanism of the carriage 1 as soon as the carriage 1 touches the stopper member 11, and the carriage 1 does not exert a force for compressing the coiled spring 13.

In case when the kinetic energy of the stopper mechanism 12 is not sufficiently attenuated when the back surface of the head 12B comes again in contact with the outer surface of the wall of the frame 3, the head 12B will collide with the frame 3. In order to prevent this collision, attenuation of the kinetic energy must be increased by supplementing a damper member.

Figure 2:
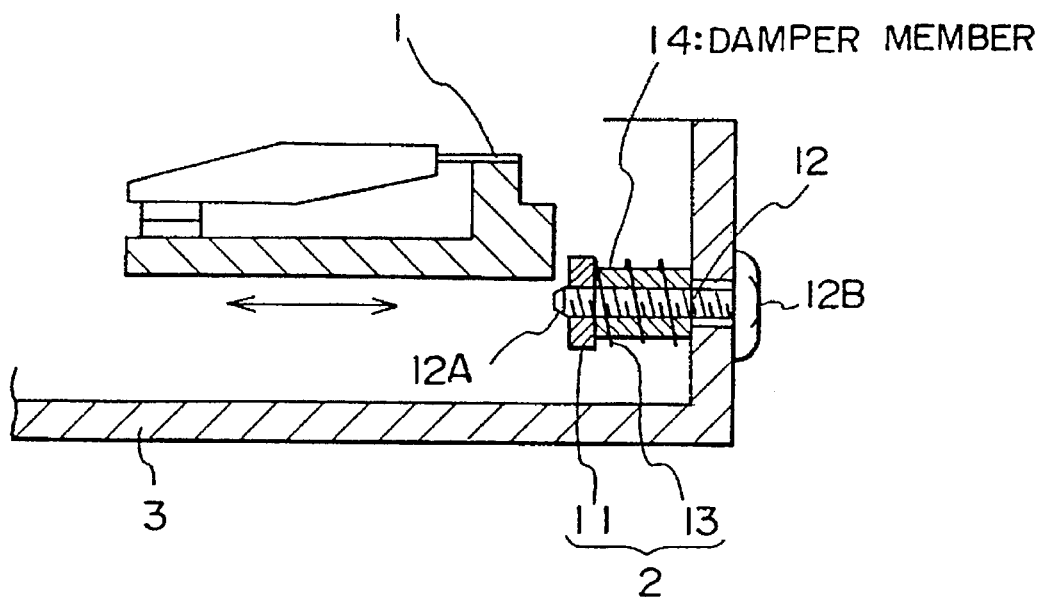
FIG. 2 shows a crosssectional view of another embodiment of this invention.
Figure 3:
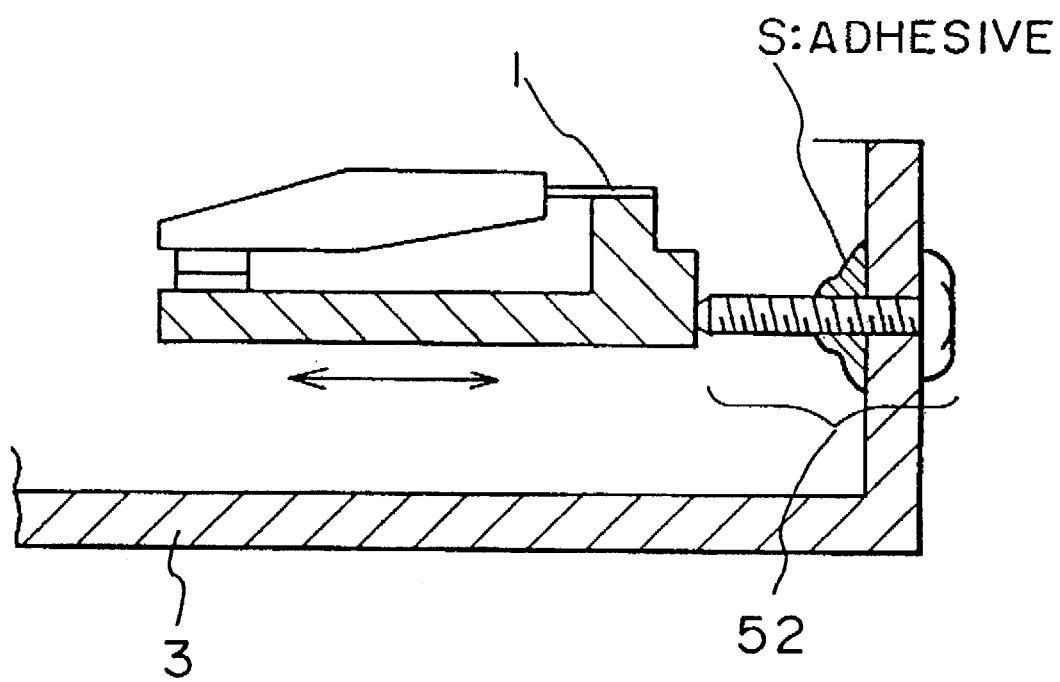
FIG. 3 shows a crosssectional view of a prior art.

Referring to FIG. 2, a damper member 14 which is made from, for example, silicon rubber, gives an additional damping on the motion of the stopper mechanism 2. In the embodiment shown in FIG. 2, the damper member 14 is a cylinder, and the body 12C of the screw 12 goes through the bore of the cylinder. Since the damper member 14 is elastic, the damper member 14 can easily be compressed in the fine adjustment of the position of the stopper member 11.

Heretofore, this invention is described on a preferred embodiment. But it must be understood that modifications can be made without departing from the scope and the spirit of this invention. For instance, the coiled spring 13 can be substituted by any such kind of elastic members as a flat spring or a laminated spring.

What is claimed is:

1. A stopper mechanism in a floppy disk apparatus comprising a magnetic head fixed on a carriage which is displaced radially relative to a floppy disk, said carriage and said floppy disk being housed in a frame, and means for stopping said radial displacement of said carriage at a limit set by said stopper mechanism, said stopping means comprising:

a screw having a head, a body, and a threaded part of said body;

a stopper member having a surface for making contact with a surface of said carriage in order to limit displacement of said carriage, said stopper member having a threaded inner portion engaged with said threaded part of said screw;

a hole in said frame for movably holding said body of said screw in a direction parallel to a direction of said radial displacement of said carriage so that said head is not in contact with said outer surface of said frame when a colliding force is applied by the carriage to said stopper member, and said head is in contact with said outer surface of said frame when said colliding force is not applied; and an elastic member inserted between said stopper member and the frame around said hole, said elastic member exerting a force to urge said head of said screw to an outer surface of said frame around said hole.

2. A stopper mechanism of claim 1, wherein said elastic member comprises a coiled spring.

3. A stopper mechanism in a floppy disk apparatus wherein a magnetic head is fixed on a carriage which is displaced radially relative to a recorded surface of a floppy disk being housed in a frame, and radial displacement of said carriage being limited by said stopper mechanism comprising:

a screw having a head, a body, and a threaded part of said body;

a stopper member having a surface for making contact with a surface of said carriage in order to limit displacement of said carriage, said stopper member having a threaded inner portion engaged with said threaded part of said screw;

a hole in said frame for movably holding said body of said screw in a direction parallel to a direction of displacement of said carriage said head and said stopper member being positioned at opposite sides of said hole and facing respectively an inner and an outer surface of said frame, said hole having a diameter smaller than the diameters of said stopper member and said head;

an elastic member inserted between said stopper member and the frame around said hole, said elastic member exerting a force to pull said head of said screw to an outer surface of said frame around said hole so that said head is not in contact with said outer surface of said frame when a colliding force is applied by the carriage to said stopper member, and said head is in contact with said outer surface of said frame when said colliding force is not applied;

and a damper member inserted between said stopper and the frame around said hole.

4. A stopper mechanism of claim 3, wherein said elastic member comprises a coiled spring.

5. A stopper mechanism of claim 3, wherein said damper member comprises a member made of silicon rubber.

* * * * *